United States Patent
Coccoli et al.

(10) Patent No.: US 10,397,054 B2
(45) Date of Patent: Aug. 27, 2019

(54) DISTRIBUTED DYNAMIC SIZING AND LOAD SELF-MANAGEMENT FOR A RELAY INFRASTRUCTURE

(71) Applicant: INTERNATIONAL BUSINESS MACHINES CORPORATION, Armonk, NY (US)

(72) Inventors: Paul Coccoli, Marietta, GA (US); Bradford A. Fisher, Chapel Hill, NC (US); Nathan P. Frith, Douglasville, GA (US); Jian Lin, Alpharetta, GA (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 15/794,204

(22) Filed: Oct. 26, 2017

(65) Prior Publication Data
US 2019/0132201 A1    May 2, 2019

(51) Int. Cl.
*H04L 12/24* (2006.01)
*H04L 12/825* (2013.01)
*H04L 12/26* (2006.01)

(52) U.S. Cl.
CPC ...... *H04L 41/0816* (2013.01); *H04L 43/0882* (2013.01); *H04L 47/26* (2013.01); *H04L 41/142* (2013.01); *H04L 43/16* (2013.01)

(58) Field of Classification Search
CPC . H04L 41/0816; H04L 43/0882; H04L 47/26; H04L 43/16; H04L 41/142
See application file for complete search history.

(56) References Cited

U.S. PATENT DOCUMENTS

| 8,015,281 B2 | 9/2011 | Baker et al. |
| 2011/0124330 A1* | 5/2011 | Kojima ............ H04W 36/32 455/424 |

(Continued)

FOREIGN PATENT DOCUMENTS

JP    2013118507 A  *  6/2013

OTHER PUBLICATIONS

"Auto Scaling User Guide" Amazon Users Guide pp. 159. <http://docs.aws.amazon.com/autoscaling/latest/userguide/as-scale-based-on-demand.html>.

(Continued)

*Primary Examiner* — Afshawn M Towfighi
(74) *Attorney, Agent, or Firm* — Edward Li (57) ABSTRACT

Methods for distributed dynamic sizing and load self-management for a relay infrastructure. In one method, a relay in a relay infrastructure determines whether a current load level of the relay reaches an expansion level of the relay and whether an overload condition of the relay infrastructure is satisfied, and the relay initiates an expansion process in response to the determination. In another method, a relay in a relay infrastructure determines whether in response to determining that an underload condition of the relay infrastructure is satisfied, and the relay initiates a contraction process in response to the determination. In yet another method, a relay in a relay infrastructure determines whether a tolerance-load condition of the relay infrastructure is satisfied, and the relay in initiates a load self-management process in response to the determination.

15 Claims, 9 Drawing Sheets

(56) References Cited

U.S. PATENT DOCUMENTS

| | | | |
|---|---|---|---|
| 2012/0239821 A1* | 9/2012 | Hozumi | H04L 67/1008 |
| | | | 709/238 |
| 2013/0070780 A1* | 3/2013 | Hozumi | H04B 7/15542 |
| | | | 370/437 |
| 2015/0067033 A1 | 3/2015 | Martinsen et al. | |
| 2016/0134463 A1 | 5/2016 | Bellizia et al. | |

OTHER PUBLICATIONS

DASHTIAFS 77 "Using onr loadbalancer" Updated Dec. 5, 2015•Originally posted on Dec. 5, 2015.

\* cited by examiner

DISTRIBUTED DYNAMIC SIZING AND LOAD SELF-MANAGEMENT FOR A RELAY INFRASTRUCTURE

BACKGROUND

The present invention relates generally to a relay infrastructure, and more particularly to distributed dynamic sizing and load self-management for a relay infrastructure.

Relays have been deployed in enterprise networks to forward traffic and aid in endpoint management. Current deployments use a fix number of relays and have the following problems. An insufficient number of relays introduce throughput saturation, connection backlog, and packet loss when traffic volume is high. An excessive number of relays consume extra hardware and computing power than necessary and thus incur high deployment cost. Furthermore, network traffic is dynamic so that it is difficult to predetermine the number of relays to deploy; over time, relays may receive loads exceeding their processing capability.

SUMMARY

In one aspect, a method for distributed dynamic sizing and load self-management for a relay infrastructure is provided. The method comprises determining, by a non-leaving relay in a relay infrastructure, whether a current load level of the non-leaving relay reaches an expansion level of the non-leaving relay and whether an overload condition of the relay infrastructure is satisfied. The method further comprises initiating, by the non-leaving relay, an expansion process, in response to determining that the current load level reaches the expansion level and in response to determining that the overload condition of the non-leaving relay infrastructure is satisfied.

In another aspect, a method for distributed dynamic sizing and load self-management for a relay infrastructure is provided. The method comprises determining, by a leaving relay being about to leave a relay infrastructure, whether an overload condition of the relay infrastructure without the leaving relay is satisfied. The method further comprises initiating, by the leaving relay, an expansion process, in response to determining that the overload condition of the relay infrastructure without the leaving relay is satisfied.

In yet another aspect, a method for distributed dynamic sizing and load self-management for a relay infrastructure is provided. The method comprises determining, by a leaving relay, whether an underload condition of the relay infrastructure is satisfied. The method further comprises initiating, by the leaving relay, a contraction process, in response to determining that the underload condition of the relay infrastructure is satisfied.

In yet another aspect, a method for distributed dynamic sizing and load self-management for a relay infrastructure is provided. The method comprises determining, by a non-leaving relay in a relay infrastructure, whether a current load level reaches an expansion level of the non-leaving relay and whether an underload condition of the relay infrastructure is satisfied. The method further comprises initiating, by the non-leaving relay, a contraction process, in response to determining that the current load level reaches the expansion level and in response to determining that the underload condition of the relay infrastructure is satisfied.

In yet another aspect, a method for distributed dynamic sizing and load self-management for a relay infrastructure is provided. The method comprises monitoring, by a server, current load levels of respective relays in a relay infrastructure. The method further comprises determining, by the server, whether an underload condition of the relay infrastructure is satisfied. The method further comprises initiating, by the server, a contraction process, in response to determining that the underload condition of the relay infrastructure is satisfied.

In yet another aspect, a method for distributed dynamic sizing and load self-management for a relay infrastructure is provided. The method comprises determining, by a leaving relay being about to leave a relay infrastructure, whether a tolerance-load condition of the relay infrastructure is satisfied. The method further comprises initiating, by the relay, a load self-management process, in response to determining that the tolerance-load condition of the relay infrastructure is satisfied.

In yet another aspect, a method for distributed dynamic sizing and load self-management for a relay infrastructure is provided. The method comprises determining, by a non-leaving relay in a relay infrastructure, whether a current load level of the non-leaving relay reaches an expansion level or a saturation level of the non-leaving relay and whether a tolerance-load condition of the relay infrastructure is satisfied. The method further comprises initiating, by the non-leaving relay, the load self-management process, in response to determining that the current load level reaches the expansion level or the saturation level and in response to determining that the tolerance-load condition of the relay infrastructure is satisfied.

DETAILED DESCRIPTION

Embodiments of the present invention disclose methods for dynamically resizing a relay infrastructure on-demand as traffic volume varies and for enabling the relays to self-manage their load to achieve a balance that tailors to a respective processing capability. The methods result in the relay infrastructure of high automatics and more resilience to single relay failure.

Embodiments of the present invention disclose a method for dynamically expanding a relay infrastructure by converting one or more endpoints into relays as workload arises, such as for handling spike traffic. The method for dynamically expanding a relay infrastructure is described as an expansion process. The mechanism is performed distributedly without a centralized controller and triggered by any individual relay.

Embodiments of the present invention disclose a method for dynamically contracting a relay infrastructure by allowing one or more endpoints to relinquish relay's roles as workload decreases. The method for dynamically contracting a relay infrastructure reduces relay deployment cost. The method for dynamically contracting a relay infrastructure is described as a contraction process. The mechanism is performed distributedly without a centralized controller and is triggered by any individual relay or the server.

Embodiments of the present invention disclose a method for enabling relays to self-manage their loads among themselves so as to avoid burdening a relay causing unacceptable error rate. The method for enabling relays to self-manage their loads is described as a load self-management process. The mechanism is performed distributedly and triggered by any individual relay to redistribute the load evenly and tailored to individual relay's capability.

In embodiments of the present invention, local statistics are maintained at each active relay node, including a current level, a saturation level, and an expansion level. In embodiments of the present invention, three regions of infrastructure statistics are defined as underload, overload, and tolerance-load, which use the local statistics as building variables and provide conditions each of three processes (including the expansion process, the contraction process, and the load self-management process of the relay infrastructure) should be targeted to, respectively. The jointly design of the local statistics and the infrastructure statistics supports execution of the proposed computational method and communication protocols.

In embodiments of the present invention, event triggering processes include a leaving relay triggered process, a non-leaving relay trigger process, and a server triggered process. The decision metrics are the local statistics, the infrastructure statistics, or a combination of them.

Embodiments of the present invention disclose a method for a client (or an endpoint) to select a relay. The method uses a vector of probability values. The result of the method is an even distribution of workload tailored to each individual relay's capacity.

Figure 1:
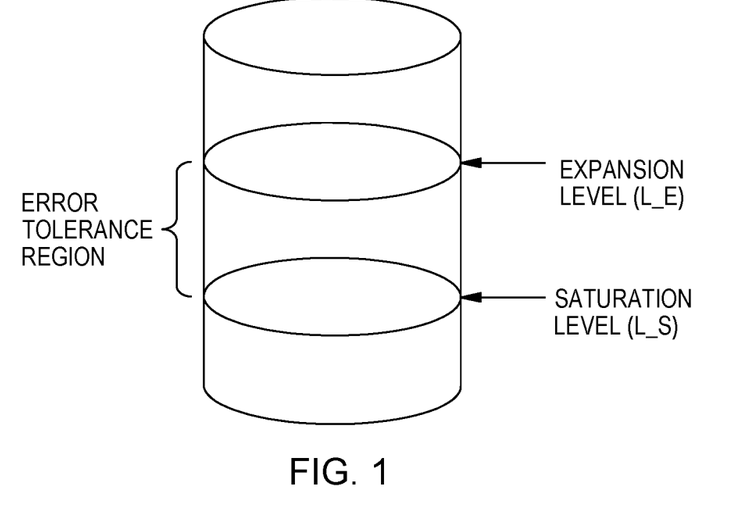
FIG. 1 is a diagram illustrating local statistics maintained at a relay node in a relay infrastructure, in accordance with one embodiment of the present invention.

FIG. 1 is a diagram illustrating local statistics maintained at a relay node in a relay infrastructure, in accordance with one embodiment of the present invention. A relay maintains the local statistics, including a current load level (L_C), a saturation level (L_S), and an expansion level (L_E). The saturation level (L_S) indicates a saturation load that the relay can handle with negligible error rate; this level is node specific and is a compound function of its hardware resources, existing software workload, and a network link capacity. The expansion level (L_E) indicates a load beyond which the error rate is intolerable, which is application specific. A range between the saturation level (L_S) and the expansion level (L_E) is an error tolerance region. The relay also maintains the statistics of other active relays in the relay infrastructure through a mechanism of a hello message. The hello message is a multi-cast message that includes {L_C, L_S, L_E}.

Three infrastructure statistics include underload, overload, and tolerance-load The relay infrastructure does not support an overall workload if $$\sum_{j=1}^{N} L_{Cj} > \sum_{j \in A} L_{Ej} \qquad (1)$$

Equation 1 defines an overload condition of the relay infrastructure.

The relay infrastructure can keep a load of each relay with a saturation level if $$\sum_{j=1}^{N} L_{Cj} \le \sum_{j \in A} L_{Sj} \qquad (2)$$

Equation 2 defines an underload condition of the relay infrastructure.

The overall workload is between an overload and an underload if $$\sum_{j \in A} L_{Sj} < \sum_{j=1}^{N} L_{Cj} \le \sum_{j \in A} L_{Ej} \qquad (3)$$

Equation 3 gives a tolerance-load condition of the relay infrastructure.

In Equations 1, 2, and 3, N is the number of current relays in the relay infrastructure. A is all the current relays if no relay is leaving the relay infrastructure, A={1, 2, . . . , N}; A is all remaining relays if relay i is leaving the relay infrastructure, A={j:j≠i}.

To support calculations of the infrastructure statistics, each relay node multicasts periodically a hello message. The hello message includes local statistics: load levels {L_C, L_S, L_E}. The hello message of the each relay node is sent to other active relay nodes and a server.

After receiving periodic hello messages generated by relays, the server maintains a table that includes the load levels of all active relays in the form of {(j, L_C, L_S, L_E)}. The active relays also maintain a table that includes the load levels of all other active relays in the form of {(j, L_C, L_S, L_E)}. j is an identity of each of the relays.

Figure 2:
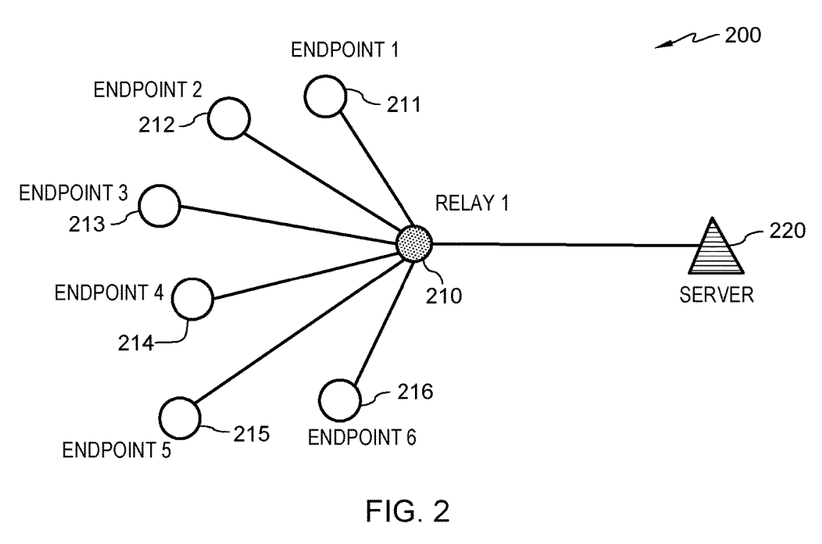
FIG. 2 is diagrams illustrating an example of a relay infrastructure, in accordance with one embodiment of the present invention.

FIG. 2 is diagrams illustrating a relay infrastructure 200, in accordance with one embodiment of the present invention. The relay infrastructure 200 is an example of a relay infrastructure, which includes relay 1 210, a server 220, endpoints 1 211 through 6 216. FIG. 2 shows an initial network (or infrastructure) topology before an expansion process, a contraction process, or a load self-management process of a relay infrastructure is initiated.

The relay infrastructure 200 may be overloaded. Therefore, the expansion process converts endpoints into relays to support overall load demand, which is otherwise unsupported by a current relay infrastructure. The expansion process can be triggered in either of two cases: (1) a load of an existing relay reaches the expansion level (L_E) and the overload condition defined by Equation 1 is satisfied; (2) an existing relay is about to leave the relay infrastructure (e.g., shutdown) and the overload condition defined by Equation 1 is satisfied.

For the first case of the expansion process, when the current load level L_C of relay 1 210 (existing relay) reaches the expansion level L_E, relay 1 210 determines whether an overload condition of the relay infrastructure 200 is satisfied (or whether Equation 1 is satisfied). If the overload condition of the relay infrastructure 200 is satisfied (or Equation 1 is satisfied), relay 1 210 initiates the expansion process in the relay infrastructure 200.

To initiate the expansion process, relay 1 210 sends an expansion message to the server 220 to request converting an endpoint to serve as a relay. The expansion message includes values of L_C, L_S, and L_E of relay 1 210. For example, for the expansion message, the source is relay 1 210, and the destination is the server 220, the type is the expansion type, and the content is load levels {L_C, L_S, L_E} of relay 1 210. Relay 1 210 reports resource-ample candidate endpoints along with their local statistics (i.e., saturation level and expansion level) to the server 220, so those candidate endpoints can be selected by the server 220 in the expansion process.

Then, form endpoints 1 211 through 6 216, the server 220 selects an endpoint to serve as a new relay. The server 220 selects an endpoint with ample resources (e.g., CPU, memory, disk, etc) in order to bring the relay infrastructure 200 out of the overload condition. In another embodiment, the server 220 can select a previously teared-down relay in a contraction process, because the previously teared-down relay may have ample resources. (The contraction process will be discussed in detail in later paragraphs.)

After selecting the endpoint, the server 220 sends a relay request message to the selected endpoint. The selected endpoint responds with a relay response message back to the server 220. It is up to the selected endpoint to decide whether it accepts to serve as a new relay. If the selected endpoint accepts, it will turn on the relay functionality such as the relay service. If the selected endpoint does not accept, the server sends another relay request message to another selected relay. For the relay request/response message, the type is the request type or the response type. For example, for the relay request message, the source is the server 220 and the destination is the selected endpoint; for the relay response message, the source is the selected endpoint, the destination is the server 220, and the content is the relay decision: accept or reject.

Figure 3:
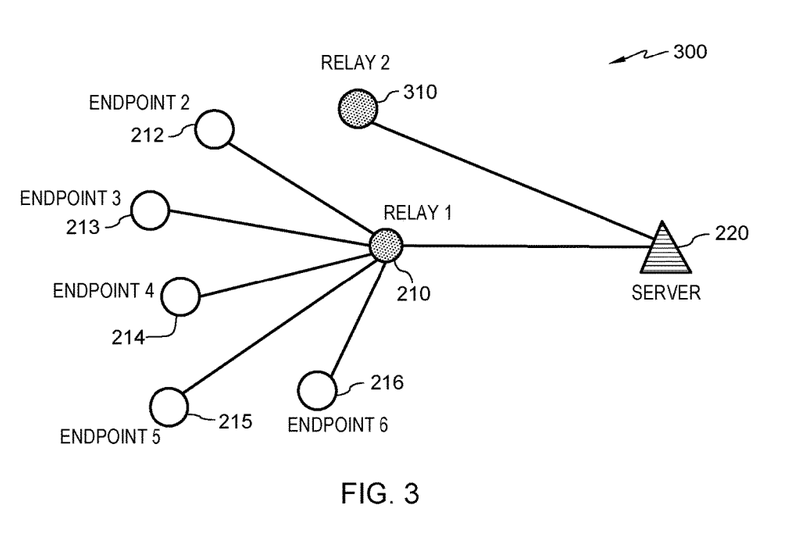
FIG. 3 is a diagram illustrating an example of a relay infrastructure resulted from an expansion process, in accordance with one embodiment of the present invention.

FIG. 3 is a diagram illustrating an example of a relay infrastructure 300 resulted from an expansion process, in accordance with one embodiment of the present invention. The server 220 determines that endpoint 1 211 shown in FIG. 2 is capable of assisting to bring the relay infrastructure 200 out of the overload condition. Therefore, endpoint 1 211 is selected by the sever 220 and accepts the request. After the expansion process, endpoint 1 211 serve as a new relay—relay 2 310. FIG. 3 shows that endpoint 1 211 is converted to relay 2 310.

Figure 4:
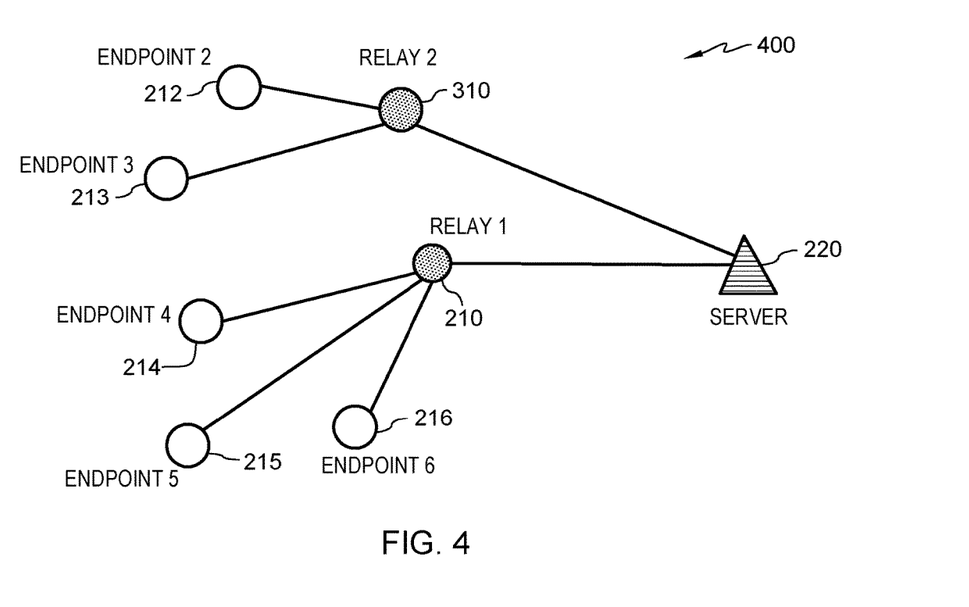
FIG. 4 is a diagram illustrating an example of a relay infrastructure resulted from an expansion process and a load self-management process, in accordance with one embodiment of the present invention.

Initially, the load of relay 2 310 is relatively low because relay 2 310 is a new relay and endpoints (including endpoints 2 212 through 6 216 show in FIG. 3) do not recognize relay 2 310. Relay 1 210 then triggers a load self-management process. (The load self-management process will be discussed in detail in later paragraphs.) Through the load self-management process, some of the load is shifted from relay 1 210 to relay 2 310. FIG. 4 is a diagram illustrating an example of relay infrastructure 400 resulted from an expansion process and a load self-management process, in accordance with one embodiment of the present invention. FIG. 4 shows an example of a new formed topology established after the load self-management process. As shown in FIG. 4, relay 1 210 unloads endpoints 2 212 and 3 213; endpoints 2 212 and 3 213 are connected to relay 2 310.

For the second case of the expansion process, an expansion process may be triggered by a leaving relay, for example, by a relay (relay i)) which is about to leave a relay infrastructure. This is a case where the relay is not a dedicated relay. When the over-load condition (defined by Equation 1) is satisfied with A={j: j≠i}, the leaving relay sends an expansion message to a server and requests converting an endpoint into a relay. After the expansion process is initiated by the leaving relay, subsequent steps will be the same as the steps described in previous paragraphs for the expansion process initiated by the existing relay.

A contraction process is to reduce the number of relays while a relay infrastructure is still able to meet the overall load demand. The contraction process is triggered in any of the three cases. (1) An existing relay is about to leave the network (e.g., to shut down) and the underload condition (defined Equation 2) is satisfied. In this first case, the contraction process will result in that all remaining relays handle the current overall load. (2) An existing relay finds its current load (L_C) reaches the expansion level (L_E) even though the underload condition (defined by Equation 2) is still satisfied. In this second case, the contraction process will distribute the relay's load to other relays. (3) A server monitors current load levels of all active relays. When the underload condition (defined by Equation 2) is satisfied, the server initiates the contraction process. In this third case, the contraction process will result in a subset of current active relays handling the current overall load and elimination of the rest relays.

In the above-mentioned first case of the contraction process, a leaving relay (e.g., relay i) initiates the contraction process. The leaving relay sends a contraction request message to the remaining relays in the relay infrastructure. For example, for the contraction request message, the type is the contraction request type, the source is the leaving relay, the destination is the remaining relays, the content is {L_C, L_S, L_E} of the leaving relay. When the remaining relays receive the contraction request message, each of the other relays calculates a set of acceptable load rates, {$R_j$}, which is defined as a normalized rate against the saturation levels. The set of acceptable load rates indicates the percentage of load among the overall load that the remaining relays is willing to accept. The set of acceptable load rates, {$R_j$}, is calculated as follows:

$$R_j = \frac{L_{Sj}}{\sum_{t \in A} L_{St}}, \text{ for } j \in A \quad (4)$$

The summation of $R_j$ is 1, so each $R_j$ represents a probability value. Each the remaining relay multicasts a contraction response message to its child endpoints, i.e., the destination of the packet is a group ID of the child endpoints. The content of the contract response message includes a set of tuples that includes a relay identity and its acceptable load rate, in the form of {(j, $R_j$)}$_{j \in A}$. When the child endpoints receive the contraction response message, each of the child endpoints re-selects its parent relay according to the following rule. An endpoint selects the relay j as its relay with probability $R_j$. Results of this process is that after endpoints re-select their relays, each relay will have a load below its respective saturation level L_S.

For the above-mentioned second case of the contraction process, in which an existing relay finds its current load (L_C) reaches the expansion level (L_E) even though the underload condition (defined by Equation 2) is still satisfied, the procedure is similar to the procedure of the above-mentioned first case of the contraction process.

For the above-mentioned third case of the contraction process, the server monitors the load levels of current active relays and finds a subset A of the current actively relays, i.e., A∈{1, 2, . . . , N} such that the underload condition (defined by Equation 2) is met. The subset of relays can handle the overall loads while keeping each relay's load below the saturation level (L_S). The server calculates $\{R_j\}_{j \in A}$ according to Equation 4. Then the server multicasts a contraction request message to all the relays in the subset A. The content filed of the contraction response message is a set of tuples: $\{(j, R_j)\}$. After receiving the contraction request message, each relay which finds its identity in the content multicasts a contraction response message to its child endpoints, the context filed is $\{(j, R_j)\}_{j \in A}$ which is gotten from the contraction request message. When receiving the contraction response message, the each endpoint will re-select its parent relay. Each relay, which does not find its identity in the content, relinquishes the relay role by turning off its relay functionality.

While the expansion process occurs for the overload condition (defined Equation 1) and the contraction process occurs for the underload condition (defined Equation 2), the load-self management process occurs for the tolerance-load condition (defined by Equation 3) that is between the overload and underload conditions. The load self-management process occurs among relays themselves and does not involve the server.

The load self-management process brings load levels of all actively relays to their respective saturation levels, by best-effort, while still being able to meet the overall load demand. While all active relays should have load below their respective expansion levels (L_E), best-effort means not every of them has the load level below their respective saturation levels (L_S). The load self-management process is triggered in either of the two cases. (1) An existing relay is about to leave the relay infrastructure (e.g., to shut down) and the tolerance load condition (defined by Equation 3) is satisfied. (2) The load of an existing relay reaches the saturation level (L_S) or expansion level (L_E) and the tolerance-load condition (defined Equation 3) is satisfied.

For the first case of the load self-management process, a leaving relay (e.g., relay i) initiates the load self-management process when the tolerance-load condition (defined by Equation 3) is satisfied. The leaving relay multicasts a load self-management request message to remaining relays in the relay infrastructure. For example, the type of the load self-management request message is the load self-management type, the source is the leaving relay, the destination is an active relay group, and the content is {L_C, L_S, L_E} of the leaving relay. After receiving the load self-management request message, one relay with the lowest L_C in the remaining relays calculates a load allocation for the remaining relays. Each relay maintains a table from hello messages including the information of L_C; therefore, the lowest L_C can be known to all the relays in the remaining relays. The relay with the lowest L_C calculates the load assigned to relay j in set A and allocates extra load (after filling every relay to their saturation level) proportional to the tolerance region. The load assigned to relay j in set A is calculated as follows:

$$L_j = L_{Sj} + \frac{L_{Ej} - L_{Sj}}{\sum_{j \in A}(L_{Ej} - L_{Sj})}\left(\sum_{j=1}^{N} L_{Cj} - \sum_{j \in A} L_{Sj}\right) \text{ for } j \in A \quad (5)$$

It can be verified that $\sum_{j \in A} L_j = \sum_{j=1}^{N} L_{Cj}$, which means all the loads get allocated. The relay with the lowest load then calculates a set of acceptable load rates, $\{R_j\}$, defined as normalized rates against the overall load. The acceptable load rates can be calculated as follows:

$$R_j = \frac{L_j}{\sum_{j=1}^{N} L_{Cj}}, \text{ for } j \in A \quad (6)$$

It can be verified that the summation of $R_j$ is 1, so each $R_j$ represents a probability value. The relay with the lowest load then multicasts a load self-management response message. For example, the destination identity of the load self-management response message is the remaining relays and the content field of the message is $\{(j, R_j)\}_{j \in A}$. When each of the remaining relays receives the load self-management response message, each of the remaining relays multicasts the load self-management response message to its child endpoints. For the load self-management response message sent by each of the remaining relays to the child endpoints, the destination is the group ID of the child endpoints, the content field of the message is also $\{(j, R_j)\}_{j \in A}$. When the child endpoints receive the load self-management response, each of the child endpoints re-selects its parent relay according to the following rule. An endpoint selects relay j as its relay with probability $R_j$.

For the second case of the load self-management process, the load self-management process is initiated by an existing relay whose load reaches L_S or L_E and when the tolerance-load condition (defined Equation 3) is satisfied. The existing relay multicasts a load self-management request message and subsequent procedure is similar to the procedure of the above-mentioned first case of the load self-management process.

Figure 5:
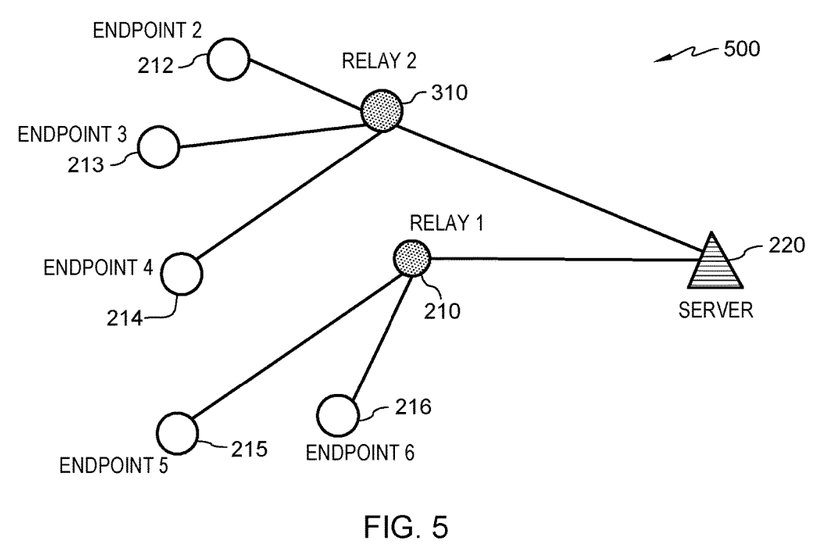
FIG. 5 is a diagram illustrating an example of a relay infrastructure resulted from a load self-management process, in accordance with one embodiment of the present invention.

FIG. 5 is a diagram illustrating an example of relay infrastructure 500 resulted from a load self-management process, in accordance with one embodiment of the present invention. It is assumed that relay 1 210 initiates the load self-management process. Comparing with FIG. 4, it is noted that endpoint 4 214 switches form relay 1 210 to relay 2 310.

Figure 6:
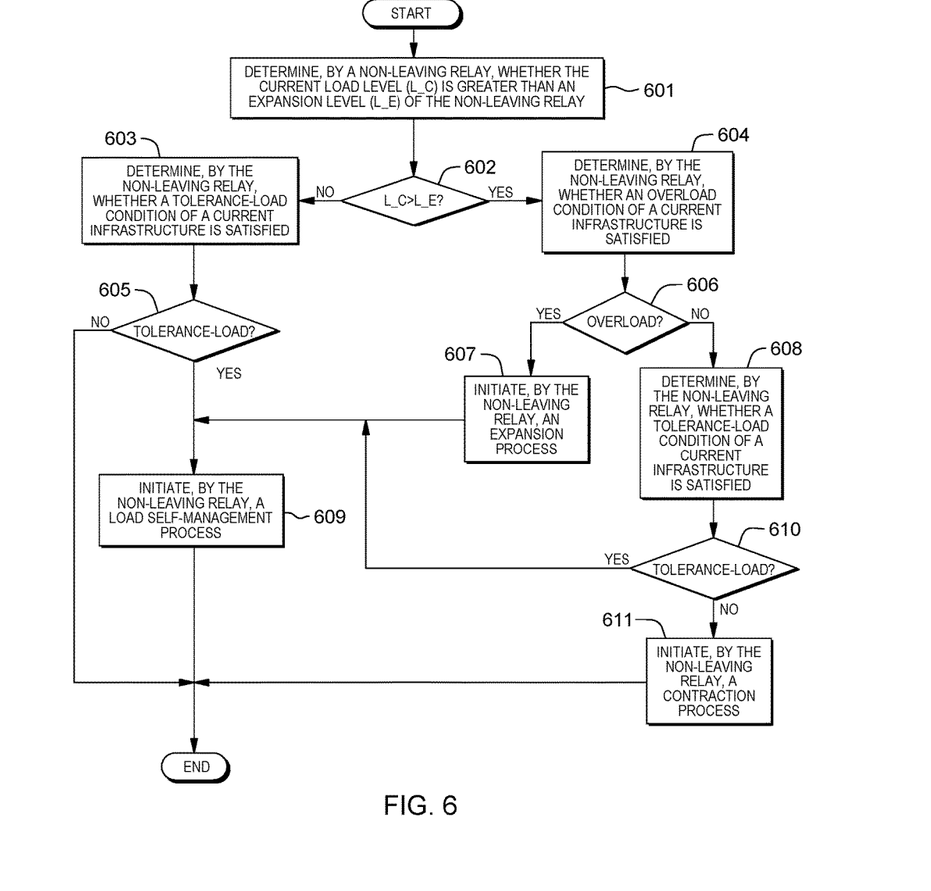
FIG. 6 is a flowchart showing operational steps for distributed dynamic sizing and load self-management triggered by a non-leaving relay, in accordance with one embodiment of the present invention.

FIG. 6 is a flowchart showing operational steps for distributed dynamic sizing and load self-management triggered by a non-leaving relay in a current relay infrastructure, in accordance with one embodiment of the present invention. A current load level (L_C) of the non-leaving relay is greater than a saturation load level (L_S) of the non-leaving relay. At step 601, the non-leaving relay determines whether the current load level (L_C) of the non-leaving relay is greater than an expansion level (L_E) of the non-leaving relay. In response determining that the current load level (L_C) of the non-leaving relay is not greater than the expansion level (L_E) of the non-leaving relay (NO branch of decision block 602), at step 603, the non-leaving relay determines whether a tolerance-load condition of a current infrastructure is satisfied. The tolerance-load condition is defined by Equation 3 given in a previous paragraph.

In response to determining that the tolerance-load condition of the current infrastructure is satisfied (YES branch of decision block 605), at step 609, the non-leaving relay initiates a load self-management process. The load self-management process is described in detail in previous paragraphs. In response to determining that the tolerance-load condition of the current infrastructure is not satisfied (NO branch of decision block 605), the non-leaving relay takes no action.

In response to determining that the current load level ($L\_C$) of the non-leaving relay is greater than the expansion level ($L\_E$) of the non-leaving relay (YES branch of decision block 602), at step 604, the non-leaving relay determines whether an overload condition of a current infrastructure is satisfied. The overload condition is defined by Equation 1 given in a previous paragraph.

In response to determining that the overload condition of the current infrastructure is satisfied (YES branch of decision block 606), at step 607, the non-leaving relay initiates an expansion process. The expansion process is described in detail in previous paragraphs. After the expansion process, the non-leaving relay executes step 609—to initiate the load self-management process.

In response to determining that the overload condition of the current infrastructure is not satisfied (NO branch of decision block 606), at step 608, the non-leaving relay determines whether the tolerance-load condition of the current infrastructure is satisfied.

In response to determining that the tolerance-load condition of the current infrastructure is satisfied (YES branch of decision block 610), the non-leaving relay executes step 609—to initiate the load self-management process.

In response to determining that the tolerance-load condition of the current infrastructure is not satisfied (NO branch of decision block 610), the non-leaving relay initiates a contraction process. The contraction process is described in detail in previous paragraphs.

Figure 7:
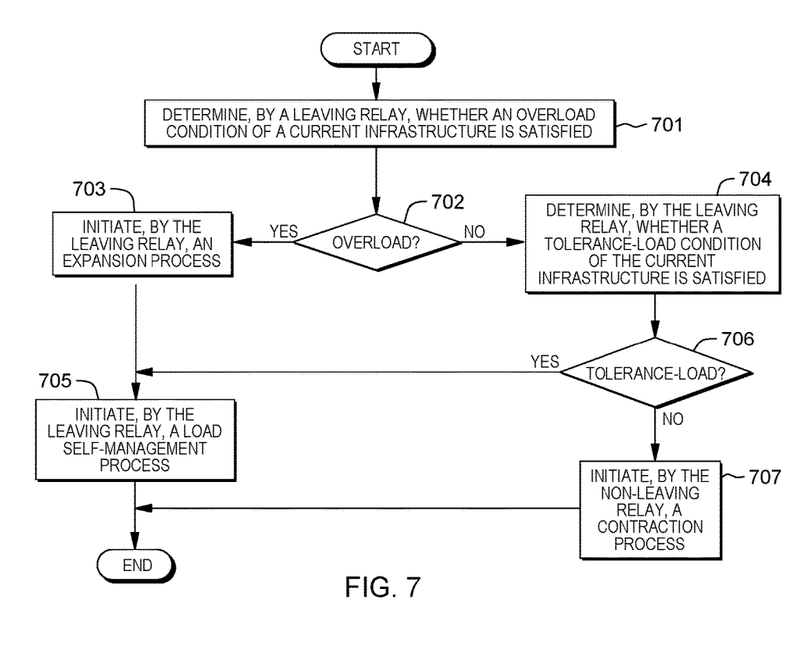
FIG. 7 is a flowchart showing operational steps for distributed dynamic sizing and load self-management triggered by a leaving relay, in accordance with one embodiment of the present invention.

FIG. 7 is a flowchart showing operational steps for distributed dynamic sizing and load self-management triggered by a leaving relay in a current relay infrastructure, in accordance with one embodiment of the present invention. At step 701, the leaving relay determines whether an overload condition of a current infrastructure is satisfied. The overload condition is defined by Equation 1 given in a previous paragraph.

In response to determining that the overload condition of the current infrastructure is satisfied (YES branch of decision block 702), at step 703, the leaving relay initiates an expansion process. The expansion process is described in detail in previous paragraphs. After the expansion process, the leaving relay at step 705 initiates a load self-management process. The load-self management process is described in detail in previous paragraphs.

In response to determining that the overload condition of the current infrastructure is not satisfied (NO branch of decision block 702), at step 704, the leaving relay determines whether a tolerance-load condition of the current infrastructure is satisfied. The tolerance-load condition is defined by Equation 3 given in a previous paragraph.

In response to determining that the tolerance-load condition of the current infrastructure is satisfied (YES branch of decision block 706), the leaving relay executes step 705—to initiate the load-self management process. In response to determining that the tolerance-load condition of the current infrastructure is not satisfied (NO branch of decision block 706), at step 707, the leaving relay initiates a contraction process. The contraction process is described in detail in previous paragraphs.

Figure 8:
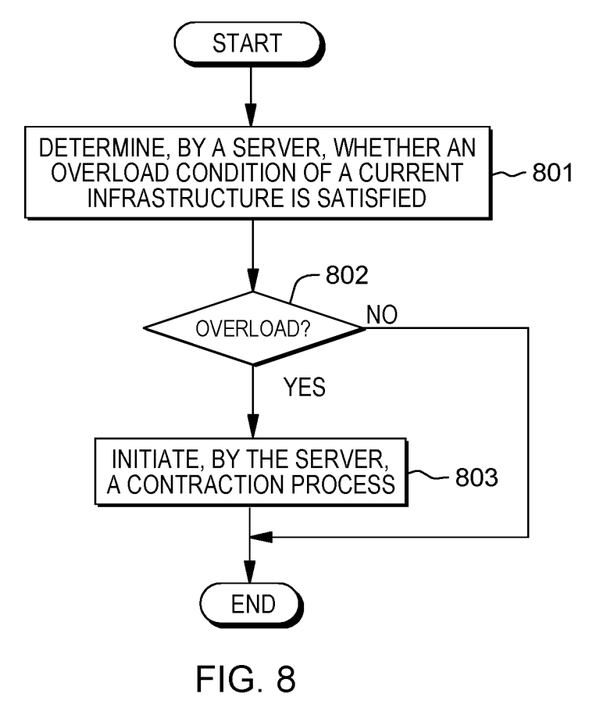
FIG. 8 is a flowchart showing operational steps for distributed dynamic sizing and load self-management triggered by a server, in accordance with one embodiment of the present invention.

FIG. 8 is a flowchart showing operational steps for distributed dynamic sizing and load self-management triggered by a server, in accordance with one embodiment of the present invention. At step 801, the server determines whether an overload condition of a current infrastructure is satisfied. The overload condition is defined by Equation 1 given in a previous paragraph. In response to determining that the overload condition is not satisfied (NO branch of decision block 802), the server takes no action. In response to determining that the overload condition is satisfied (YES branch of decision block 802), the server at step 803 initiates a contraction process. The contraction process is described in detail in previous paragraphs.

As described in previous paragraphs, communication messages are involved in each of the expansion process, the contraction process, and the load self-management process. An example of a packet format for the communication messages is given in Table 1. A summary of messages types and type-specific contents is given in Table 2.

TABLE 1

Packet Format

| Packet Headers | Source Identity | Destination Identity | Type | Type Specific Contents |
|---|---|---|---|---|

TABLE 2

Summary of Message Type and Type-specific Content

| Type of Message | Multicast or Unicast | Content Field |
|---|---|---|
| Expansion Message | Unicast | Load Levels ($L\_C$, $L\_S$, $L\_E$) |
| Hello Message | Multicast | Load Levels ($L\_C$, $L\_S$, $L\_E$) |
| Relay Request Message | Unicast | Load Levels ($L\_C$, $L\_S$, $L\_E$) |
| Relay Response Message | Unicast | Relay Decision |
| Contraction Request Message | Multicast | Load Levels ($L\_C$, $L\_S$, $L\_E$) |
| Contraction Response Message | Multicast | Acceptable Load Rates $\{j, R_j\}$ |
| Load Self-Management Request Message | Multicast | Load Levels ($L\_C$, $L\_S$, $L\_E$) |
| Load Self-Management Response Message | Multicast | Acceptable Load Rates $\{j, R_j\}$ |

Figure 9:
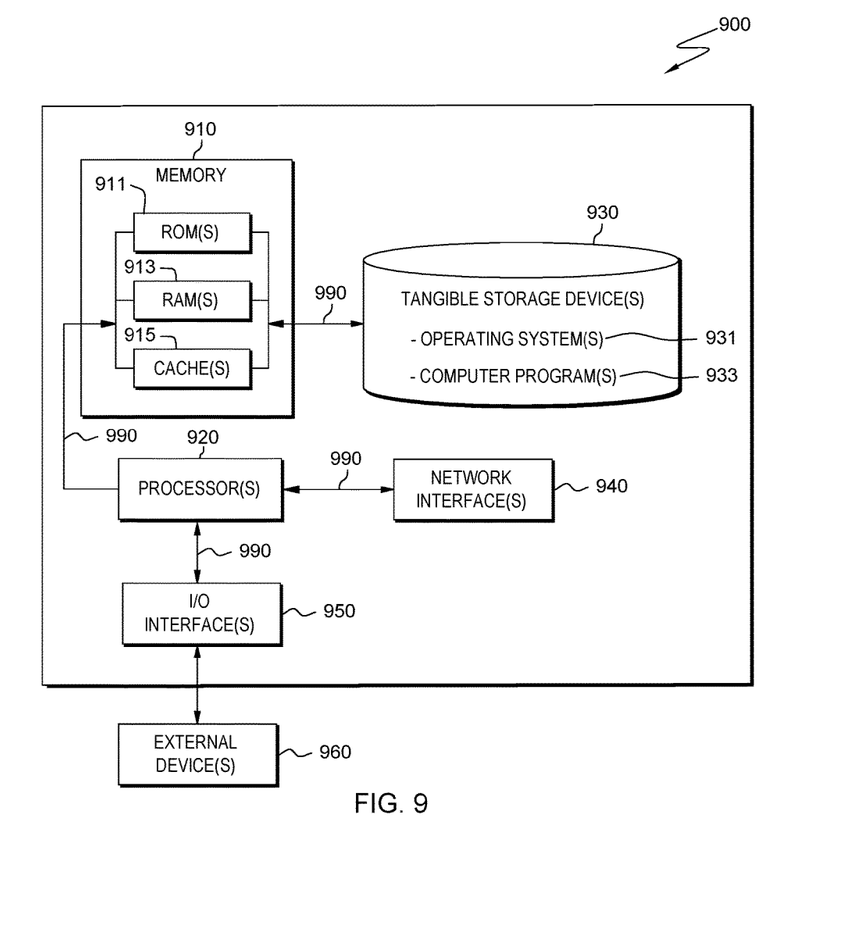
FIG. 9 is a diagram illustrating components of a computer device for a relay, a server, or an endpoint, in accordance with one embodiment of the present invention.

FIG. 9 is a diagram illustrating components of a computer device 900 for a relay (such as relay 1 210 in FIG. 2-FIG. 5 or relay 2 310 in FIG. 3-FIG. 5), a server (such as server 220 in FIG. 2-FIG. 5), or an endpoint (such as a respective one of endpoint 1 211 through endpoint 6 216 in FIG. 2-FIG. 5), in accordance with one embodiment of the present invention. It should be appreciated that FIG. 9 provides only an illustration of one implementation and does not imply any limitations with regard to the environment in which different embodiments may be implemented. The computer device may be any electronic device or computing system capable of receiving input from a user, executing computer program instructions, and communicating with another electronic device or computing system via a network.

Referring to FIG. 9, the computer device 900 includes processor(s) 920, memory 910, and tangible storage device(s) 930. In FIG. 9, communications among the above-mentioned components of the computer device 900 are denoted by numeral 990. Memory 910 includes ROM(s) (Read Only Memory) 911, RAM(s) (Random Access Memory) 913, and cache(s) 915. One or more operating systems 931 and one or more computer programs 933 reside on one or more computer readable tangible storage device(s) 930. On a computer device for generating scarecrow resources deactivating evasive malware, one or more computer programs 933 include one or more programs for distributed dynamic sizing and load self-management. The computer device 900 further includes I/O interface(s) 950. I/O interface(s) 950 allows for input and output of data with external device(s) 960 that may be connected to the computer device 900. The computer device 900 further includes network interface(s) 940 for communications between the computer device 900 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for distributed dynamic sizing and load self-management for a relay infrastructure, the method comprising:
    determining, by a non-leaving relay in a relay infrastructure, whether a current load level of the non-leaving relay reaches an expansion level of the non-leaving relay and whether an overload condition of the relay infrastructure is satisfied;
    in response to determining that the current load level reaches the expansion level and in response to determining that the overload condition of the non-leaving relay infrastructure is satisfied, initiating, by the non-leaving relay, an expansion process;
    sending to a server, by the non-leaving relay, an expansion message, in response to initiating the expansion process;
    sending to the server, by the non-leaving relay, local statistics of endpoints of the non-leaving relay;
    selecting from the endpoints, by the server, an endpoint and converting the endpoint to a first new relay; and
    shifting, by the non-leaving relay, one or more endpoints of the non-leaving relay to the first new relay.

2. The method of claim 1, the further comprising:
    sending to the endpoint, by the server, a relay request message; and
    receiving from the endpoint, by the server, a relay response message.

3. The method of claim 1, the further comprising:
    determining, by a leaving relay being about to leave the relay infrastructure, whether an overload condition of the relay infrastructure without the leaving relay is satisfied; and
    in response to determining that the overload condition of the relay infrastructure without the leaving relay is satisfied, initiating, by the leaving relay, the expansion process.

4. The method of claim 3, further comprising:
    sending to a server, by the leaving relay, an expansion message, in response to initiating the expansion process;
    sending to the server, by the leaving relay, local statistics of endpoints of the leaving relay;
    selecting from the endpoints, by the server, an endpoint and converting the endpoint to a second new relay; and
    shifting, by the leaving relay, one or more endpoints of the leaving relay to the second new relay.

5. The method of claim 4, further comprising:
    sending to the endpoint, by the server, a relay request message; and
    receiving from the endpoint, by the server, a relay response message.

6. A method for distributed dynamic sizing and load self-management for a relay infrastructure, the method comprising:
    determining, by a leaving relay being about to leave a relay infrastructure, whether an underload condition of the relay infrastructure is satisfied;
    in response to determining that underload condition of the relay infrastructure is satisfied, initiating, by the leaving relay, a contraction process;
    sending, by the leaving relay, a contraction request message to respective remaining relays in the relay infrastructure, in response to initiating the contraction process;
    calculating, by the respective remaining relays, a set of acceptable load rates of the remaining relays;
    multicasting, by the respective remaining relays, to respective endpoints of the respective remaining relays, a contraction response message comprising the set of the acceptable load rates; and
    re-selecting, by each of the respective endpoints, a parent relay, in response to receiving the contraction response message.

7. The method of claim 6, further comprising:
    determining, by a non-leaving relay in the relay infrastructure, whether a current load level reaches an expansion level of the non-leaving relay and whether the underload condition of the relay infrastructure is satisfied; and
    in response to determining that the current load level reaches the expansion level and in response to determining that the underload condition of the relay infrastructure is satisfied, initiating, by the non-leaving relay, the contraction process.

8. The method of claim 7, further comprising:
    sending, by the non-leaving relay, a contraction request message to respective relays in the relay infrastructure, in response to initiating the contraction process;
    calculating, by respective relays, a set of acceptable load rates of the respective relays;
    multicasting, by the respective relays, to respective endpoints of the respective relays, a contraction response message comprising the set of the acceptable load rates; and
    re-selecting, by each of the respective endpoints, a parent relay, in response to receiving the contraction response message.

9. The method of claim 6, further comprising:
    monitoring, by a server, current load levels of respective relays in the relay infrastructure;
    determining, by the server, whether the underload condition of the relay infrastructure is satisfied; and
    in response to determining that the underload condition of the relay infrastructure is satisfied, initiating, by the server, the contraction process.

10. The method of claim 9, further comprising:
    calculating, by the server, a set of acceptable load rates of the respective relays;
    multicasting, by server, to the respective relays, a contraction response message comprising the set of the acceptable load rates of the respective relay;
    multicasting, by the respective relays, to respective endpoints of the respective relays, the contraction response message; and
    re-selecting, by each of the respective endpoints, a parent relay, in response to receiving the contraction response message.

11. A method for distributed dynamic sizing and load self-management for a relay infrastructure, the method comprising:
    determining, by a leaving relay being about to leave a relay infrastructure, whether a tolerance-load condition of the relay infrastructure is satisfied;
    in response to determining that the tolerance-load condition of the relay infrastructure is satisfied, initiating, by the leaving relay, a load self-management process;

multicasting, by the leaving relay, to respective remaining relays in the relay infrastructure, a load self-management request message, in response to initiating the load self-management process;

calculating, by a relay with a lowest current load, a load allocation for the respective remaining relays, in response to receiving the load self-management request message; and calculating, by the relay with the lowest current load, a set of acceptable load rates of the respective remaining relays, based on the load allocation.

12. The method of claim 11, further comprising:

multicasting, by the relay with the lowest current load, to the respective remaining relays, a load self-management response message comprising the acceptable load rates;

multicasting, by the respective remaining relays, to respective endpoints, the load self-management response message;

re-selecting, by each of the respective endpoints, a parent relay, in response to receiving the load self-management response message.

13. The method of claim 11, further comprising:

determining, by a non-leaving relay in the relay infrastructure, whether a current load level of the non-leaving relay reaches an expansion level or a saturation level of the non-leaving relay and whether the tolerance-load condition of the relay infrastructure is satisfied; and in response to determining that the current load level reaches the expansion level or the saturation level and in response to determining that the tolerance-load condition of the relay infrastructure is satisfied, initiating, by the non-leaving relay, the load self-management process.

14. The method of claim 13, further comprising:

multicasting, by the non-leaving relay, to respective relays in the relay infrastructure, a load self-management request message;

calculating, by a relay with a lowest current load, a load allocation for the respective relays in the relay infrastructure, in response to receiving the load self-management request message; and calculating, by the relay with the lowest current load, a set of acceptable load rates of the respective relays, based on the load allocation.

15. The method of claim 14, further comprising:

multicasting, by the relay with the lowest current load, to the respective relays in the relay infrastructure, a load self-management response message comprising the acceptable load rates;

multicasting, by the respective relays, to respective endpoints, the load self-management response message;

re-selecting, by each of the respective endpoints, a parent relay, in response to receiving the load self-management response message.

\* \* \* \* \*